United States Patent

[11] 3,601,427

[72] Inventor Charles F. Holt
 Rte. 2, Box 220, Corvallis, Oreg. 97330
[21] Appl. No. 835,146
[22] Filed June 20, 1969
[45] Patented Aug. 24, 1971

[54] ANTISWAY TRAILER HITCH
 11 Claims, 6 Drawing Figs.
[52] U.S. Cl. ................................................ 280/406 A,
 280/447, 280/489
[51] Int. Cl. ............................................... B62d 53/00
[50] Field of Search ........................................ 280/406,
 406 A, 447, 489

[56] References Cited
UNITED STATES PATENTS
2,828,144 3/1958 Hosmer ....................... 280/483
3,400,948 9/1968 Matson ......................... 280/406
3,434,735 3/1969 Bernard ........................ 280/406
3,353,842 11/1967 Lewis .......................... 280/447

Primary Examiner—Leo Friaglia
Attorney—Buckhor, Blore, Klarquist and Sparkman

ABSTRACT: The trailer hitch inhibits sidesway of a trailer by use of a transversely extending track tube connected at its opposite ends to the rear of the towing vehicle. A drawbar hinged to the trailer and pivoted to the traction vehicle includes a pivoted guide sleeve movable on rollers laterally along the tube for transmitting towing power between the towing and towed vehicles. A forward portion of the drawbar extends to permit lateral movement of the guide sleeve on the track tube. The drawbar has a swivel coupling permitting relative rolling movement between the vehicles. A rear portion of the drawbar has a load equalizer including a coil spring operable in conjunction with the trailer jack to vary the distribution of the axle loads between the trailer and towing vehicle.

PATENTED AUG 24 1971 3,601,427
SHEET 1 OF 2
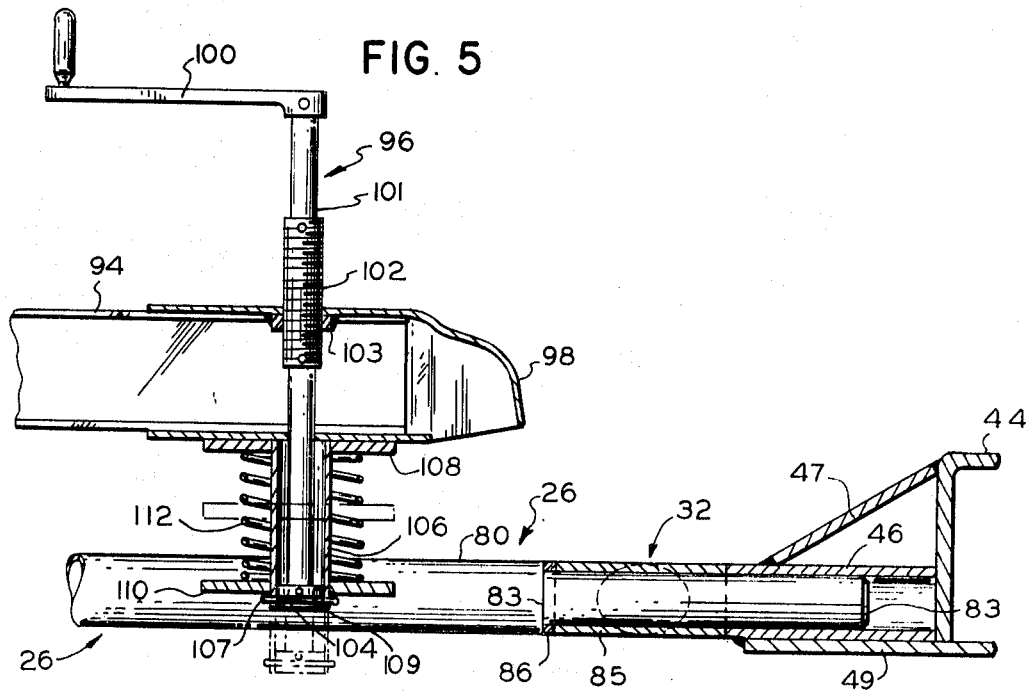
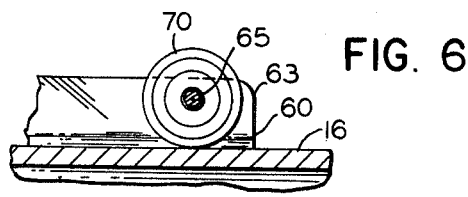
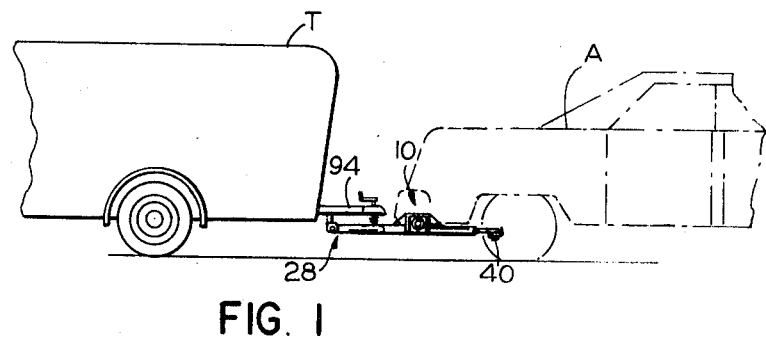
CHARLES F. HOLT
INVENTOR
BY
BUCKHORN, BLORE, KLARQUIST & SPARKMAN
ATTORNEYS

CHARLES F. HOLT
INVENTOR

BY
BUCKHORN, BLORE, KLARQUIST & SPARKMAN
ATTORNEYS

ANTISWAY TRAILER HITCH

BACKGROUND OF THE INVENTION

1. Field of the Invention

The present invention relates to a trailer hitch. It more particularly relates to a trailer hitch for preventing sidesway and equalizing the axle loads on the towed and towing vehicles.

2. Description of the Prior Art

The prior art includes a trailer hitch utilizing a laterally extending rail to inhibit sidesway. However, such rail is of open channel construction which permits dirt, mud and grit to collect and thereby inhibit lateral tracking movement of the trailer drawbar along the rail, thereby seriously impairing the effectiveness and life of the hitch.

Prior hitches of the foregoing type are also longitudinally rigid and do not permit relative rolling movement between the tractor and trailer about a longitudinal axis except for limited rolling movement at the ball-and-socket connection between the hitch and trailer tongue. However, forces at this point are undesirable for they tend to separate the ball and socket. In such prior hitch, leaf springs in conjunction with the ball-and-socket connection further inhibit relative rolling movement between the tractor and trailer and therefore increase the torsional stress on the hitch.

The prior tracking-type hitch of the foregoing type has provision for equalizing the axle loads between tractor and trailer. However, such means does not operate satisfactorily under heavy loads. Therefore using vehicles using a hitch must be loaded with care to prevent overloading.

SUMMARY OF THE INVENTION

The present invention overcomes the deficiencies of the prior art track-type hitch through the provision of a track-type hitch having (1) a track assembly of closed construction capable of functioning in the presence of mud and dirt, (2) a built-in swivel coupling permitting unrestricted rolling movement between tractor and trailer without the use of a dangerous ball-and-socket connection, and (3) load equalizer means operable with the trailer jack to distribute trailer loads between the axles of the trailer and tractor vehicles.

Primary objects of the hitch assembly of the invention are to:

1. inhibit trailer sidesway through the use of a tracking hitch assembly;
2. provide free tracking movement of the hitch drawbar uninhibited by mud or dirt;
3. permit unrestricted twisting movement between tractor and trailer through a swivel coupling in the hitch drawbar;
4. vary the distribution of axle loads between tractor and trailer by means of the hitch assembly;
5. distribute axle loads through use of the trailer jack in conjunction with the hitch assembly;
6. permit rolling, pitching, and yawing movements between tractor and trailer at three longitudinally separated points along the hitch drawbar;
7. provide a safe yet inexpensive hitch construction which can be manufactured using primarily readily available standard parts.

BRIEF DESCRIPTION OF THE DRAWINGS

The foregoing and other objects and advantages of the present invention will become more apparent from the following detailed description which proceeds with reference to the accompanying drawings wherein:

FIG. 1 is a fragmentary side view of an automobile towing a trailer using a hitch assembly in accordance with the invention;

FIG. 5 is a vertical sectional view taken along the line 5—5 of FIG. 2 on a scale larger than FIG. 2 and slightly smaller than FIG. 4; and FIG. 6 is a sectional view taken along the line 6—6 of FIG. 4.

DETAILED DESCRIPTION

With reference to the drawings, FIG. 1 discloses an automobile A towing a trailer T using a track-type hitch assembly 10 in accordance with the invention.

Figure 3:
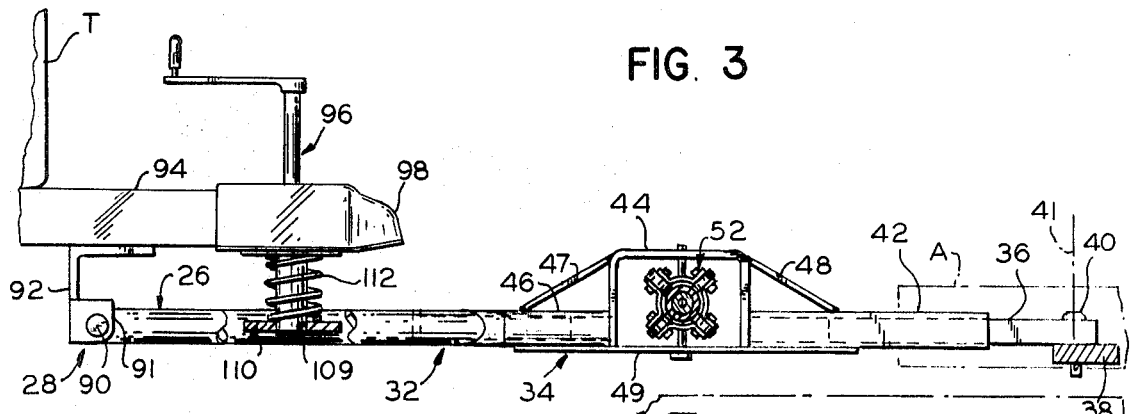
FIG. 3 is a vertical sectional view taken along line 3—3 of FIG. 2 on the same scale as FIG. 2.
Figure 2:
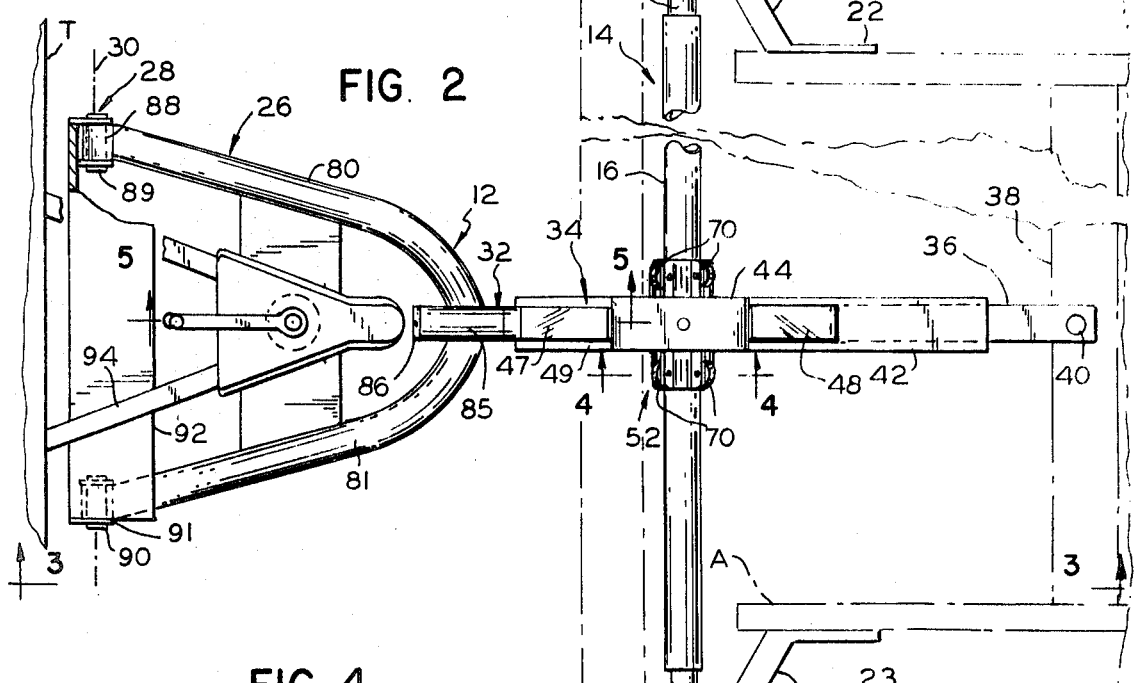
FIG. 2 is a plan view of the hitch assembly shown in FIG. 1 on an enlarged scale.

Referring more particularly to FIGS. 2 and 3, hitch assembly 10 includes a drawbar assembly 12 and a track assembly 14. Track assembly 14 includes a tubular track member 16 extending transversely at the rear of the traction vehicle A. A smaller diameter tube 18 extends through tube 16 to strengthen the track member, although such smaller tube is optional. First and second connector means including connector arms 20, 21, connect the opposite ends of track member 16 to the rear of the automobile, preferably at the bumper brackets, using fasteners 22, 23.

Drawbar means 12 includes a rear forked portion 26 joined to trailer T at a third, hinged connection 28 for movement about a transverse hinge axis 30. The forward end of fork portion 26 is joined at a fourth, swivel connection 32 to an intermediate drawbar portion 34. A forward drawbar portion 36 telescopes within intermediate portion 34 to vary the length of the drawbar as required. Forward portion 36 of the drawbar is connected to the frame 38 of the traction vehicle by a pivot pin 40 enabling pivoting of the drawbar assembly about a vertical pivot axis 41.

Forward drawbar member 36 is rectangular in cross section and slides within a rectangular tube portion 42 of the intermediate drawbar section 34. Rectangular tube 42 joins one side of an open rectangular sleeve mounting bracket 44. A section of round tubing 46 projects rearwardly from a bracket 44 to form a continuation of the drawbar to swivel coupling 32. Angular metal straps 47, 48 and a bottom plate 49 reinforce the connection.

A generally cylindrical tracking sleeve member 52 is mounted by vertically aligned pivot pins 54, 55 within bracket 44 for pivotal movement about the vertical axis of the pins, extending through drawbar means 12. Tubular member 16 extends through tracking sleeve 52. Sleeve member 52 provides lateral tracking movement of drawbar 12 axially along track member 16 as permitted by the extensible forward portion 36 of the drawbar assembly.

Figure 4:
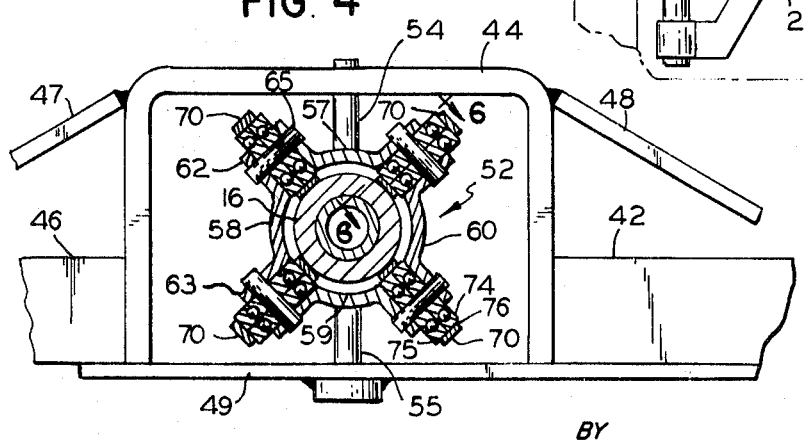
FIG. 4 is a vertical sectional view taken along the line of 4—4 of FIG. 2 on a larger scale than FIG. 2.

With reference to FIG. 4, tracking sleeve 52 is made up of four sleeve sections 57, 58, 59, 60 in surrounding but spaced relationship to track member 16. Each sleeve section has a pair of radial flanges 62, 63 spaced from corresponding flanges of adjacent sleeve sections. Roller means, including four rollers 70 are rotatably mounted by pins 65 within the slots between adjacent flanges 62, 63 at each end of the tracking sleeve. Thus a total of eight rollers support the tracking sleeve and thus the drawbar on the track tube 16. The radically innermost periphery of the eight rollers extend inwardly of the four sleeve sections and engage the cylindrical outer surface of track tube 16 to maintain the track tube in centered spaced relationship to the sleeve sections and to permit rolling movement of the tracking sleeve along the track tube.

Each of the eight rollers 70 is made up of a pair of sealed ball bearing members 74, 75 press-fitted into an outer metal rim 76. The four rollers at each end of sleeve 52 are symmetrically arranged about the circumference of the track member at positions offset from the horizontal and vertical planes through the axis of such member. With this arrangement together with the sealed roller bearings, closed tubular track and tracking sleeve, the tracking assembly is shielded from dirt and other foreign matter, and will not "freeze" in their presence.

Tube section 46 of the drawbar joins fork arms 80, 81 of fork section 26 at swivel coupling 32. As shown best in FIGS. 2 and 5, swivel connection 32 includes an extra heavy-walled pipe section 83 fixed within pipe section 46. Pipe section 83 extends rearwardly through another pipe section 85 to which fork arms 80, 81 are fixed. Pipe section 83 remains rotatable with respect to pipe section 85 to form bearing surface for swiveling movement of pipe section 85 relative to pipe section 46. A locking ring 86 retains pipe section 83 within pipe section 85. Thus the intermediate and forward portions of the drawbar assembly can swivel with respect to the rearward forked section of the assembly while the drawbar assembly remains longitudinally rigid.

Referring to FIGS. 2 and 3, fork arms 80, 81 of the drawbar diverge rearwardly and are connected to the trailer at hinge connection 28. The rear ends of fork arms 80, 81 form knuckles 88 which are joined by removable hinge pins 89, 90 to hinge brackets 91 on a lower portion of an angle member 92. Of course, a single long rod (not shown) extending through both knuckles and brackets could be substituted for the two hinge pins. Angle member 92 is fixed to the underside of a forwardly projecting tongue 94 of trailer T. Thus to remove the hitch assembly from the trailer, hinge pins pins 89, 90 are simply removed from hinge brackets 91 and knuckles 88.

Trailer tongue 94 has the usual trailer jack 96 just rearwardly of the conventional socket portion 98 for a conventional ball-and-socket hitch connection (not shown) which is not used. As shown in FIG. 5, trailer jack 96 includes a crank handle 100 and vertical jack shift 101 including a threaded portion 102 threaded through a nut 103 on tongue 94.

In accordance with the present invention the hitch includes an equalizer assembly operable in conjunction with the trailer jack to distribute the load imposed by the trailer between the rear axle of the automobile and the trailer axle. This is done by raising and lowering the hitch assembly and thus the trailer tongue and rear of the automobile using the trailer jack. For this purpose jack shaft 101 extends through trailer tongue 94 and terminates at its lower end in an enlarged cap 104. The jack shaft slides within a vertical pipe section 106 upon operation of the jack handle. However, the shaft is prevented from protruding from the lower end of the pipe section 106 by a pin 107. This pin is removed when the jack is used in the normal way without the hitch. Pipe section 106 terminates at its upper end in a horizontal plate 108 which, in the upwardly retracted position of the jack as shown in FIG. 5, abuts the underside of trailer tongue 94. The lower end of pipe section 106 extends through a central opening 109 of a plate 110 which extends between the opposite fork arms 80, 81 of the drawbar.

A coil spring 112 extends between upper plate 108 and drawbar plate 110. This spring maintains vertical separation between the trailer tongue 94 and the drawbar portion therebeneath and prevents collapse of the trailer about its hinge connection 28.

Because the drawbar is longitudinally rigid and has no hinge connection with the traction vehicle about a horizontal axis, any tendency to raise the front end of the trailer also tends to lift the drawbar and rear end of the traction vehicle, thereby tending to unload the rear wheels of the traction vehicle.

With the trailer jack and equalizer elements arranged as shown in FIG. 5 with cap 104 engaging pin 107, any effort to screw jackshaft 101 downwardly further below trailer tongue 94 tends to push pipe section 106 downwardly through opening 109 of drawbar plate 110, thereby forcing plate 108 to compress downwardly also as indicated in dashed lines and tending to compress coil spring 112 between the two plates 108 and 110.

However, spring 112 resists compression, and therefore the downward extension of jackshaft 101 below trailer tongue 94 elevates the tongue above plate 108. Elevation of tongue 94 raises hinge connection 28, therefore also raising the drawbar and unloading the rear axle of towing vehicle A. This shifts part of the load from such rear axle to the trailer axle.

Upward movement of the jackshaft has the reverse effect, shifting a portion of the load from the trailer axle to the rear axle of the towing vehicle.

The foregoing hitch construction has been found to reduce sidesway considerably in drawing relatively large, heavy trailer with a lightweight towing vehicle. The extensible nature of the forward drawbar portion 36 enables the drawbar, including guide sleeve 52, to track transversely of the vehicle along tubular track 16 and thereby shift the point at which pulling forces are transmitted to the towing vehicle to counter any tendency of the trailer to sway.

The illustrated hitch assembly eliminates the usual dangerous ball-and-socket connection between tractor and trailer while allowing maximum rolling at the swivel connection 32. At the same time the tracking principle employed by the hitch assembly operates in the presence of dirt and mud. A further advantage of the hitch assembly is its simplicity of manufacture, using almost entirely conventional structural members, thereby minimizing its cost of manufacture. Finally the load equalizer feature operable in conjunction with a conventional trailer hitch enables safe and proper distribution of the axle loads between tractor and trailer. All of the above features combine to provide a hitch which increases the safety of towing highway trailers.

Having shown and described a preferred embodiment illustrative of the principles of my invention, it should be apparent to those skilled in the art that the same permits of modification in arrangement and detail. My intention is not to be limited by the illustrated embodiment, but to include within the scope of my invention all such modifications and equivalent constructions.

I claim:

1. In a trailer hitch assembly:
   a track assembly including an elongated track member and first and second connector means for connecting the opposite ends of said track member to a traction vehicle at laterally opposite sides of said vehicle in a manner so that said track member extends transversely of said vehicle,
   a drawbar assembly including trailer drawbar means, third connector means for connecting one end of said drawbar means to a trailer vehicle, and fourth connector means for connecting the opposite end of said drawbar means to said traction vehicle at a point laterally between the points of connection of said first and second connector means and forwardly of said track member,
   said track member having a closed cylindrical outer surface,
   a tracking sleeve means pivoted to said drawbar means intermediate the opposite ends thereof for pivotal movement about an upright axis extending through said drawbar means,
   said track member extending through said tracking sleeve means,
   said tracking sleeve means including a plurality of roller means rotatably carried by said sleeve means and adapted for rolling engagement with the outer surface of said track member at spaced positions circumferentially of said track member in a manner permitting free rolling movement of said sleeve means along said track member,
   said drawbar means extensible in length between said fourth connector means and said sleeve means to permit pivoting movement of said drawbar means about said fourth connector means.

2. A hitch assembly according to claim 1 wherein each said roller means includes a series of ball bearing members.

3. A hitch assembly according to claim 1 wherein said roller means include at least four roller member spaced symmetrically about said track member and in rolling engagement with said track member at positions offset with respect to the horizontal and vertical planes through the axis of said track member.

4. Apparatus according to claim 1 wherein said sleeve means comprises a generally cylindrical sleeve member defined by a series of separate curved sleeve sections interconnected by said roller means, said roller means, said roller means extending inwardly of the inner diameter of said sleeve member.

5. A hitch assembly according to claim 1 wherein said drawbar means includes swivel means between said third connector means and said sleeve means for permitting relative rotation between the portion of said drawbar means rearwardly of said swivel means and the portion of said drawbar means forwardly of said swivel means about the longitudinal centerline of said drawbar means.

6. A hitch assembly according to claim 1 wherein said third connector means includes means for providing a hinge connection of said drawbar means with a forward portion of a trailer vehicle about a transverse hinge axis, and adjustable load equalizer means, said load equalizer means including compression spring means adapted to extend between said drawbar means and a portion of said trailer vehicle forwardly of said hinge axis to exert a separating force therebetween, and means for operatively connecting said spring means with a trailer jack on said forward trailer portion in a manner such that operation of said jack tends to vary the compression of said spring means and thereby change the elevation of the forward end of the trailer vehicle.

7. Apparatus according to claim 6 wherein said means for connecting said spring means with a trailer jack includes a vertical tube means surrounding an extensible vertical shaft portion of said trailer jack, said compression spring means comprising a coil spring surrounding said vertical sleeve member, the lower end of said spring means abutting said drawbar means, the lower end of said spring means abutting an enlarged portion of said vertical tube means, the lower end of said vertical tube means including an abutment member limiting the downward movement of said jackshaft within said vertical tube means and means providing an opening through said drawbar means permitting downward movement of said jackshaft and vertical tube means through said drawbar opening, whereby downward movement of said jackshaft tends to compress said coil spring to elevate the forward portion of said trailer vehicle.

8. Apparatus according to claim 6 including swivel means between said equalizer means and said sleeve means permitting relative swiveling movement between forward and rear portions of said drawbar means a longitudinal axis extending between said vehicles.

9. A trailer hitch assembly comprising:
drawbar means including first connector means for hingedly connecting a rear portion of said drawbar means to a forward portion of a trailing vehicle for movement about a transverse hinge axis and second connector means for connecting a forward portion of said drawbar means to a towing vehicle,
said drawbar means between said first and second connector means being longitudinally rigid,
adjustable load equalizer means including compression spring means adapted to extend between said drawbar means and a portion of the trailing vehicle forwardly of said hinge axis to exert a separating force between said drawbar means and said trailer,
said equalizer means including means operatively connected to said spring means and operable with a trailer jack on said forward trailer portion in a manner such that operation of said jack tends to vary the compression of said spring means and thereby change the elevation of the forward end of the trailer vehicle, said hinge axis and thus said drawbar means and rear end of the towing vehicle to vary the load distribution between the rear axle of the towing vehicle and the axle of said trailer vehicle.

10. Apparatus according to claim 9 wherein said means for connecting said spring means with a trailer jack includes a vertical tube means surrounding an extensible vertical shaft portion of said trailer jack, said compression spring means comprising a coil spring surrounding said vertical tube means, the lower end of said spring means abutting said drawbar means, the upper end of said spring means abutting an enlarged portion of said vertical tube means, said vertical tube means including an abutment member limiting the downward movement of said jackshaft within said tube means, and means providing an opening through said drawbar means permitting downward movement of said jackshaft and vertical tube means through said drawbar opening, whereby downward movement of said jackshaft tends to compress said coil spring to elevate the forward portion of said trailer vehicle.

11. Apparatus according to claim 9 including swivel means on said drawbar means positioned between said load equalizer means and said second connector means for providing relative rolling movement between forward and rear portions of said drawbar means about a longitudinal centerline of said drawbar means.